United States Patent
D'Huart et al.

(10) Patent No.: US 11,852,265 B2
(45) Date of Patent: Dec. 26, 2023

(54) LAYING TOWER AND METHOD FOR LAYING PIPELINES ON A BED OF A BODY OF WATER

(71) Applicant: SAIPEM S.p.A., San Donato Milanese (IT)

(72) Inventors: Pierre Emmanuel D'Huart, San Donato Milanese (IT); Michel Baylot, San Donato Milanese (IT); Alessio Mameli, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 268 days.

(21) Appl. No.: 17/276,418

(22) PCT Filed: Sep. 18, 2019

(86) PCT No.: PCT/IB2019/057868
§ 371 (c)(1),
(2) Date: Nov. 1, 2021

(87) PCT Pub. No.: WO2020/058877
PCT Pub. Date: Mar. 26, 2020

(65) Prior Publication Data
US 2022/0163138 A1 May 26, 2022

(30) Foreign Application Priority Data
Sep. 18, 2018 (IT) .................. 102018000008685

(51) Int. Cl.
*F16L 1/19* (2006.01)
*F16L 1/20* (2006.01)
(Continued)

(52) U.S. Cl.
CPC .............. *F16L 1/207* (2013.01); *B63B 35/03* (2013.01); *F16L 1/19* (2013.01); *F16L 1/225* (2013.01)

(58) Field of Classification Search
CPC ... F16L 1/207; F16L 1/19; F16L 1/225; F16L 1/235; F16L 1/205; F16L 1/161
See application file for complete search history.

(56) References Cited

U.S. PATENT DOCUMENTS 6,361,250 B1 * 3/2002 de Varax ................. F16L 1/207
405/168.4
8,827,596 B2 * 9/2014 Chiodini ................. B66D 1/26
405/173
(Continued)

FOREIGN PATENT DOCUMENTS

| WO | WO 2005/090844 A1 | 9/2005 |
| WO | WO 2009/153352 A1 | 12/2009 |
| WO | WO 2012/101233 A2 | 8/2012 |

OTHER PUBLICATIONS

Notification Concerning Submission, Obtention or Transmittal of Priority Document for International Application No. PCT/IB2019/057868 dated Nov. 8, 2019.
(Continued)

*Primary Examiner* — Carib A Oquendo
(74) *Attorney, Agent, or Firm* — Neal, Gerber & Eisenberg LLP (57) ABSTRACT

A laying tower for laying pipelines on the bed of a body of water has a supporting structure extending along a longitudinal axis and provided with guides parallel to the longitudinal axis; a first clamp, which is mounted on the supporting structure and configured for selectively clamping and releasing the pipeline in a given point along the longitudinal axis; and a second clamp, which is selectively movable along a path, which extends along a first section above the first
(Continued)

clamp; and a second section below the first clamp and, partly, below the supporting structure and configured for selectively clamping and releasing the pipeline along the path.

33 Claims, 8 Drawing Sheets

(51) Int. Cl.
    *B63B 35/03*     (2006.01)
    *F16L 1/225*     (2006.01)

(56) References Cited

U.S. PATENT DOCUMENTS

| | | | |
|---|---|---|---|
| 9,695,959 B2* | 7/2017 | Mottini | F16L 1/18 |
| 10,859,185 B2* | 12/2020 | Moceri | F16L 1/205 |
| 2005/0207849 A1* | 9/2005 | Roodenburg | E21B 19/09 |
| | | | 405/166 |
| 2011/0123273 A1* | 5/2011 | Feijen | F16L 1/12 |
| | | | 405/166 |
| 2011/0236137 A1* | 9/2011 | Legaignoux | F16L 1/19 |
| | | | 405/158 |
| 2013/0294838 A1* | 11/2013 | Bianchi | F16L 1/19 |
| | | | 405/168.1 |
| 2017/0108142 A1* | 4/2017 | Bianchi | B63B 35/03 |

OTHER PUBLICATIONS

International Search Report and Written Opinion for International Application No. PCT/IB2019/057868 dated Nov. 19, 2019.
PCT Demand for International Preliminary Examination and Reply to International Search Report and the associated Written Opinion for International Application No. PCT/IB2019/057868 dated Mar. 12, 2020.
Notification of Receipt of Demand by Competent International Preliminary Examining Authority (Form PCT/IPEA/402) for International Application No. PCT/IB2019/057868 dated Mar. 18, 2020.
Notification of Transmittal of the International Preliminary Report on Patentability (Form PCT/IPEA/416) for International Application No. PCT/IB2019/057868 dated Apr. 30, 2020.

* cited by examiner

LAYING TOWER AND METHOD FOR LAYING PIPELINES ON A BED OF A BODY OF WATER

PRIORITY CLAIM

This application is a national stage application of PCT/IB2019/057868, filed on Sep. 18, 2019, which claims the benefit of and priority to Italian Patent Application No. 102018000008685, filed on Sep. 18, 2018, the entire contents of which are each incorporated by reference herein.

TECHNICAL FIELD

The present disclosure relates to a laying tower for laying pipelines on a bed of a body of water.

BACKGROUND

Pipelines for transporting hydrocarbons are laid on the bed of a body of water by laying vessels, each of which is configured for assembling the pipeline on board the laying vessel and for laying the pipeline as it is gradually assembled. Thus, the laying vessel comprises assembling equipment and a launching ramp for the so-called "S" launch or a laying tower for carrying out the so-called "J" launch. The letters "S" and "J" identify the type of launch in relation to the shape, which the pipeline assumes between the laying vessel and the bed of the body of water. The so-called "S" launch is particularly adapted for laying pipelines with relatively high productivity on relatively medium shallow sea-beds, while the so-called "J" launch is adapted for laying the pipeline on relatively deep sea-beds and along relatively steep escarpments.

Generally, a laying vessel equipped with a laying tower as those disclosed in PCT Patent Application Publication No. WO 2012/101233 and PCT Patent Application Publication No. WO 2005/090844 comprises at least one area for prefabricating joints having a unitary length, generally 12 meters, for forming multiple joints having a multiple length of the unitary length. The multiple joints supply the laying tower in succession and are joined to the pipeline during construction, which is partly arranged in the body of water. In a typical configuration, the laying tower comprises a supporting structure, which can be hinged to the laying vessel; a first clamp arranged in a given position along the supporting structure and a second clamp arranged above the first clamp and movable along the frame for providing a laying travel for advancing the pipeline towards the body of water having a length substantially equal to the length of the multiple joint, and a successive return travel. The movement of the pipeline comprises that at least one among the first and the second clamp is in contact with the pipeline in the construction phase. The joining of the multiple joints aligned with the pipeline in the construction phase is performed in the laying tower in a single work station and the time for performing this junction influences the overall laying time of the pipeline. To this end, it would be desirable to produce particularly long multiple joints in order to reduce the number of joints performed in the laying tower. However, particularly long multiple joints require particularly long laying towers, which allow the second clamp to make a longer laying travel. Moreover, when a particularly long laying tower is arranged in a vertical position or close to the vertical position, a large laying vessel is needed to operate in relative safety. It follows that increased productivity in laying pipelines on the bed of the body of water is possible, but requires important investments in relatively large vessels.

SUMMARY

It is the object of the present disclosure to provide a particularly versatile laying tower, which reduces certain of the drawbacks of certain of the prior art.

According to certain embodiments of the present disclosure, a laying tower is provided for laying pipelines on the bed of a body of water, the laying tower comprising:
a supporting structure extending along a longitudinal axis and comprising guides parallel to the longitudinal axis;
a first U-shaped clamp, which is mounted on the supporting structure and configured for selectively clamping and releasing the pipeline in a given point along the longitudinal axis and comprises a U-shaped structure and a plurality of first jaws and a plurality of first actuators supported by the U-shaped structure and configured for actuating the jaws between an open position and a closed position; and
a second clamp, movable along a path, which extends along a first section, extending above the first clamp: and a second section arranged below the first clamp and partly, below the supporting structure and configured for selectively clamping and releasing the pipeline along the path, wherein the first clamp is mounted on the supporting structure so as to be selectively arranged in a first position along the longitudinal axis and in a second position remote from the longitudinal axis.

In these embodiments, the second clamp is capable of performing laying travels guided by the supporting structure along the first section and above the first clamp and laying travels along the second section only partially guided by the supporting structure. It follows that the laying travels along the second section are not limited by the extension of the supporting structure of the laying tower and the laying tower is capable of laying relatively long multiple joints without needing an elevated height of the laying tower. A relatively taller laying tower should be required supported by a relatively larger laying vessel.

According to certain embodiments of the present disclosure, the selective arrangement of the first clamp in a first position along the longitudinal axis and in a second position remote from the longitudinal axis enables the transit of the second clamp along the gripping zone of the first clamp and the transit of special bulky pieces, such as, for example, valve assemblies associated with the multiple joint. The possibility of arranging the second clamp above the first clamp enables the configuration of the laying tower to be changed between a first configuration, wherein the second clamp makes a laying travel above the first clamp with the limits imposed by the supporting structure and a second configuration, wherein the second clamp makes laying travels below the first clamp.

Since the second section of the path extends mainly in the body of water, the laying tower comprises a cable actuating device configured for controlling the position of the second clamp, both along the supporting structure and along the pipeline.

In greater detail, the cable actuating device comprises two winches mounted to the supporting structure and two cables connected to the second clamp. The cables are parallel and act substantially in synchronism so as to avoid misalignments of the second clamp.

In greater detail, the laying tower comprises a first arm hinged to the supporting structure and configured for supporting the first clamp and tilting the first clamp between the first and the second position. In certain embodiments, the operation is carried out by hydraulic actuators.

It should be appreciated that to enable the movement of the first clamp from the position along the longitudinal axis and the insertion of the same along the longitudinal axis also when a pipeline is present. the first clamp comprises a U-shaped structure; a plurality of first jaws and a plurality of first actuators supported by the U-shaped structure and configured for actuating the jaws between an open position and a closed position.

According to certain embodiments of the present disclosure, the laying tower comprises a trolley, which comprises a frame; and two cursors, which are arranged on opposite sides of the frame and configured for engaging the guides.

In greater detail, the second clamp is hung to the trolley and hinged to the trolley. In this way, the group formed by the trolley and by the second clamp is capable of being advanced along curved paths without transmitting particular stress to the pipeline and vice versa. As such, when the group formed by the trolley and by the second clamp is guided only by the pipeline, it is not engaged in the supporting structure, the pipeline can assume a relatively slight curvature.

From a structural point of view, the second clamp comprises an annular structure; a plurality of second jaws; and a plurality of second actuators supported by the annular structure and configured for actuating the respective second jaws between a closed position and an open position. If, on the one hand, the annular structure does not enable the second clamp to be disengaged laterally from the pipeline, on the other. the annular structure enables gripping forces. distributed about the pipeline, to be exerted. In this case, the second clamp comprises a plurality of rollers for guiding the second clamp along the pipeline in order to prevent rubbing between the second clamp and the pipeline when the second clamp slides with respect to the pipeline.

According to certain embodiments of the present disclosure, the laying tower comprises a supply and control system of the second clamp comprising at least one supply cable connected to the trolley for supplying hydraulic power and/or electricity to the second clamp and exchanging signals between the second clamp and a control station. In these embodiments, the supply cable can be wound and unwound to follow the position of the trolley and the second clamp.

According to certain embodiments of the present disclosure, the laying tower comprises a transfer clamp, which is arranged above the first clamp, it is configured for selectively clamping, releasing and supporting a multiple joint, and it is mounted to the supporting structure by a movable arm configured for arranging the transfer clamp between a rest position remote from the longitudinal axis; an operative position along the longitudinal axis; and an operative position offset with respect to the longitudinal axis. In this way, the transfer clamp grips the multiple joint at the lower end thereof when it is not yet aligned with the longitudinal axis and arranges it, by the movable arm, at the longitudinal axis. When the multiple joint has been joined to the pipeline, the transfer clamp is arranged in a position where it does not hinder the laying operations.

In particular, the arm is hinged to the supporting structure and is telescopic to guarantee a positioning on a plane perpendicular to the longitudinal axis.

It should be appreciated that since the transfer clamp is not capable of transferring the multiple joint by itself, the laying tower comprises a plurality of manipulator arms, which are mounted to the supporting structure above the first clamp, they can be selectively coupled to a multiple joint for transferring the multiple joint between a position offset with respect to the longitudinal axis and a position coincident with the longitudinal axis. Unlike the transfer clamp, the manipulator arms do not have the function of supporting the weight of the multiple joint.

In the laying tower, the multiple joint is held in position along the longitudinal axis by a plurality of guiding devices, which are configured for axially coupling, in a sliding manner, to a multiple joint.

When the second clamp is arranged along the second section of the path, the upper free end of the multiple joints is housed in an aligning device, movable along the longitudinal axis and configured for keeping the multiple joint aligned with the longitudinal axis.

According to certain embodiments of the present disclosure, the laying tower comprises a load device, which comprises an arm; an actuating mechanism for arranging the arm between a lowered position and a raised position substantially parallel to the longitudinal axis; and a plurality of gripping devices distributed along the arm for selectively gripping a multiple joint in a plurality of points. In these embodiments, the transfer clamp and the manipulator arms grip a multiple joint arranged opposite the supporting structure while it is supported by the arm in the raised position and by the gripping devices.

According to certain embodiments of the present disclosure, the supporting structure comprises a main frame hinged to the laying vessel about an axis; and a lower frame, said guides extending along the main frame and the lower frame. In these embodiments, the lower frame has a dual function: when the second clamp is operative along the first section of the path, the lower frame acts as a traditional stinger of a laying tower; when the second clamp is operative along the second section of the path, the lower frame guides the trolley for at least a portion of the second section of the path.

According to certain embodiments of the present disclosure, the supporting structure comprises an upper frame hinged to the main frame, movable between an operative position, wherein it defines the prolongation of the main frame and a rest position, wherein it is arranged side by side to the main frame.

The upper frame is an appendage of the main frame and it is configured for supporting only the aligning device. When the upper frame is tilted, the overall size of the laying tower is substantially similar to the size of a laying tower sized for multiple joints having a shorter length than the multiple joints, which can be manipulated by the laying tower, the subject of the present disclosure.

It is a further object of the present disclosure to provide a laying vessel for laying pipelines on the bed of a body of water, which reduces certain of the drawbacks of certain of the prior art.

According to certain embodiments of the present disclosure, a laying vessel is provided for laying pipelines on the bed of a body of water comprising a deck and a laying tower, which is hinged in proximity of said deck about an axis, which extends above and below said axis and is made according to certain embodiments of the present disclosure. In this way, it is not necessary to use a relatively large laying vessel also for laying particularly long multiple joints. In this specific case, a laying vessel configured for carrying out laying operations with quadruple joints can carry out laying operations with hexajoints, when the same laying vessel is equipped with the laying tower, the subject of the present disclosure. Such a configuration provides the possibility of modifying laying towers of existing laying vessels, making them more relatively efficient in terms of productivity and versatility.

According to certain embodiments of the present disclosure, the laying vessel comprises an assembling station mounted in a movable manner along the deck for being selectively arranged in an operative position about said longitudinal axis and above the first clamp for joining a multiple joint to the pipeline and a remote position with respect to the operative position.

Furthermore, the laying vessel comprises a platform, movable between a horizontal rest position and an operative position parallel to the longitudinal axis for arranging, in proximity of the supporting structure, a multiple joint coupled to a special part of the pipeline.

It is a further object of the present disclosure to provide a laying method for laying pipelines on the bed of a body of water, which reduces certain of the drawbacks of certain of the prior art.

According to certain embodiments of the present disclosure, a laying method is provided for laying pipelines on the bed of a body of water, the method comprising the steps of:
holding the free end of a pipeline in a given position in the laying step, with a first U-shaped clamp arranged in a supporting structure of a laying tower;
joining a multiple joint to the free end of the pipeline in the laying tower above the first clamp;
clamping the pipeline to a second clamp movable along a given path, which extends along a first section arranged above the first clamp and along a second section below the first clamp and partly, below the supporting structure;
releasing the first clamp from the pipeline;
arranging the first clamp between a first position along said path and in a second position remote from said path;
laying the pipeline with a travel of the second clamp along one between the first and the second section of the path; and
selectively arranging the second clamp above the first clamp for operating with first multiple joints having a length substantially equal to the length of the first section and below the first clamp for operating with second multiple joints having a length substantially equal to the length of the second section.

It should be appreciated that since the second clamp is movable along a path, which extends both above and below the first clamp and below the supporting structure, no constraints are imposed by the supporting structure on the length of the first section of the path, therefore, with the present method, it is possible to lay multiple joints for which the supporting structure would be undersized if such multiple joints were laid with the second clamp arranged above the first clamp. In other words, the second section is longer than the first section, in particular, the length of the first section is substantially equal to the length of a first multiple joint and the length of the second section is substantially equal to the length of a second multiple joint having a length greater than the first multiple joint.

In particular, the method comprises guiding the second clamp by both the supporting structure and the pipeline, only by the supporting structure, and only by the pipeline. In these embodiments, in the recovery travel in the opposite direction to the laying travel, the second clamp slides for at least a part of the second section only along the pipeline.

According to one aspect of the present disclosure, the method comprises releasing the second clamp from the supporting structure and guiding the second clamp uniquely by the pipeline in said body of water along at least a part of the second section. In particular, in the successive return travel, after a laying travel along the second section of the path, the second clamp is released from the supporting structure and the second clamp is uniquely guided by the pipeline.

According to certain embodiments of the present disclosure, the method comprises moving the second clamp along the path by a cable actuating device, which enables the second clamp to be moved at a distance.

In particular, the cable actuating device comprises two winches operated in synchronism and two cables connected to the second clamp to avoid torsions of the second clamp when the second clamp is not guided by the supporting structure.

According to certain embodiments of the present disclosure, the method comprises selectively arranging the first clamp between a first position along said path and in a second position remote from said path. In this way, the first clamp does not hinder the passage of bulky pieces and the passage of the second clamp. In these embodiments, the second clamp can operate both in a configuration, wherein the first clamp performs laying travels above the first clamp and in a configuration, wherein it performs laying travels below the first clamp. The transit possibility of the second clamp at the first clamp enables the passage from one configuration to the other seamlessly and without interrupting the pipeline laying operations.

The operative configuration change of the laying tower enables laying operations to be carried out with multiple joints having a different length depending on the need and convenience.

It should be appreciated that the method comprises selectively arranging the second clamp above the first clamp for operating with multiple joints having a length substantially equal to the length of the first section and below the first clamp for operating with multiple joints having a length substantially equal to the length of the second section.

According to certain embodiments of the present disclosure, the method comprises guiding the second clamp along the pipeline by a plurality of rollers mounted in a rotatable manner on the second clamp. In this way, friction and rubbing are avoided between the second clamp and the pipeline.

According to certain embodiments of the present disclosure, the method comprises supplying the second clamp with a supply cable. In these embodiments, the supply cable is similar to an umbilical.

BRIEF DESCRIPTION OF THE FIGURES

Further features and advantages of the present disclosure will become clear from the following description of a non-limiting embodiment thereof, with reference to the figures of the attached drawings. wherein.

DETAILED DESCRIPTION

Figure 1:
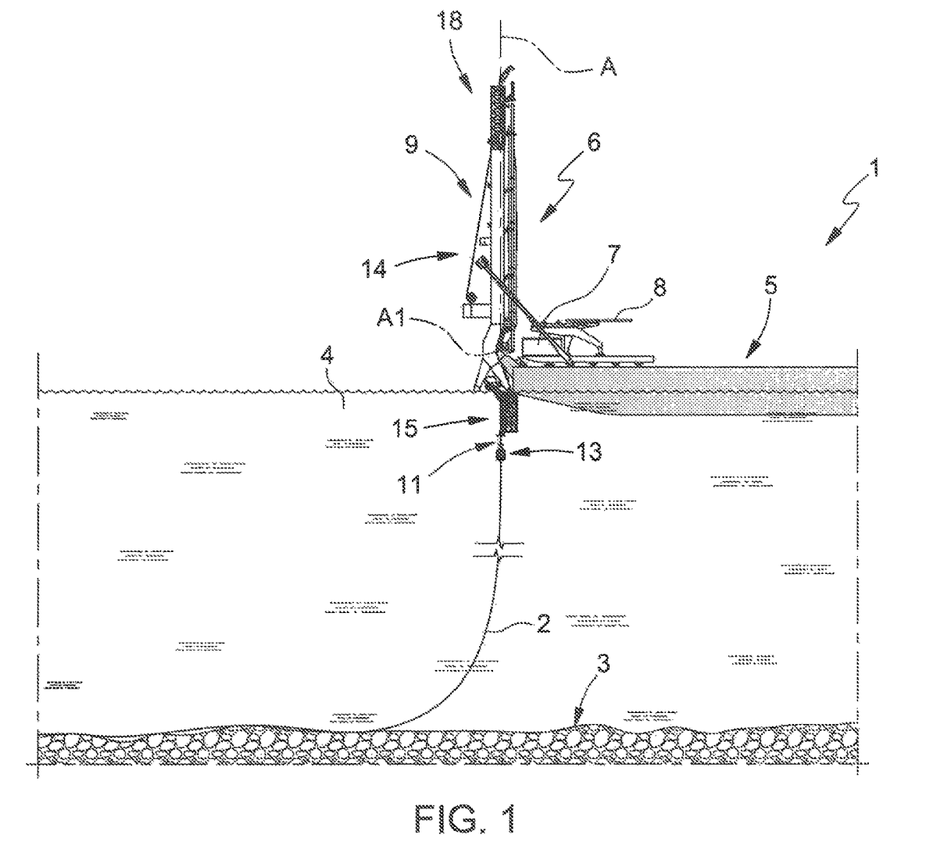
FIG. 1 is a side elevational view, with parts removed for clarity, of a laying vessel comprising a laying tower made according to the present disclosure.

A laying vessel 1 configured to lay a pipeline 2 on the bed 3 of a body of water 4 is globally represented, with reference to FIG. 1. The term "pipeline" is understood to mean both a complete pipeline and a pipeline in the process of being manufactured.

Figure 2:
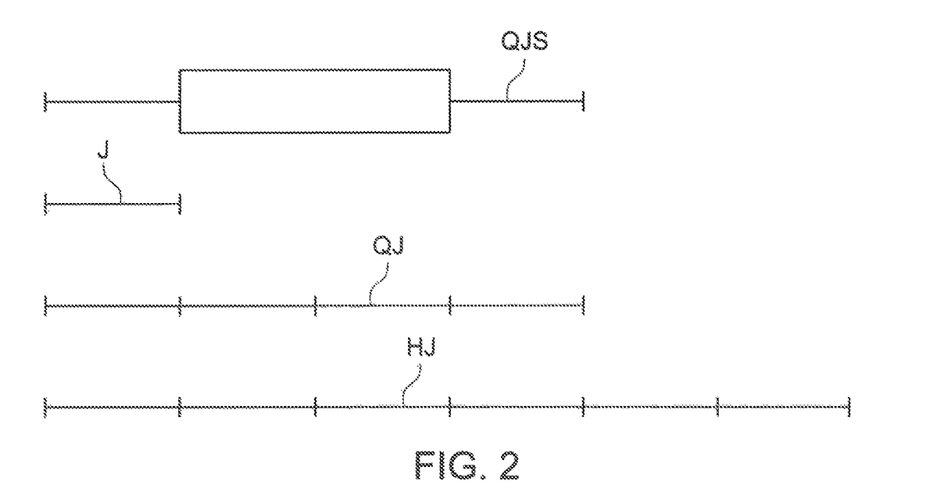
FIG. 2 is a schematic view, with parts removed for clarity, relating to a unitary joint, a quadruple joint, a joint with a special piece, and a hexajoint, manipulable by the laying vessel in FIG. 1.

With reference to FIG. 2, the term "unitary joint" J is understood to mean a piece of tube having a unitary length, generally 12 meters, which is joined in a prefabrication station (not shown) to one or more unitary joints J to form "multiple joints" (QJ quadruple joint; HJ sextuple joint or hexajoint; and QJS quadruple joints comprising special pieces).

With reference to FIG. 1, the laying vessel 1 comprises a deck 5; and a laying tower 6, which is hinged to the laying vessel 1 close to the deck 5 about an axis A1 and extends above and below the first axis A1 and partly in the body of water 4. The laying tower 6 extends along a longitudinal axis A transverse to the axis A1 and it is selectively movable between a lowered position substantially parallel to the deck 5 and a raised position substantially perpendicular to the deck 5.

By way of example, in the description of certain embodiments of the present disclosure, reference will be made to a laying vessel 1 and to a laying tower 6 sized to lay a pipeline 2 to which quadruple joints QJ (FIG. 2) are progressively joined in successive steps, but which is also capable of operating with hexajoints HJ (FIG. 2). Furthermore, the definition of "multiple joint" comprises both the quadruple joints QJ (FIG. 2), and hexajoints HJ (FIG. 2). In the present description, besides defining the extension axis of the laying tower 6, the longitudinal axis A identifies the axis along which the pipeline 2 and/or the multiple joint extend, when the pipeline 2 and/or the multiple joint are in the laying tower 6. In these embodiments, the position of the pipeline 2 or of the multiple joint inside the laying tower 6 can be identified by the longitudinal axis A.

The laying vessel 1 comprises an assembling station 7 mounted in a movable manner on the deck 5 for selectively being arranged in an operative position about the longitudinal axis A and a remote position with respect to the operative position; a platform 8 movable between a horizontal rest position and an operative position parallel to the longitudinal axis A for the loading of quadruple joints comprising special pieces QJS (FIG. 2), such as elements of a relative considerable size; and a prefabrication station (not shown), wherein the unitary joints J (FIG. 2) are assembled to form the multiple joints.

Figure 3:
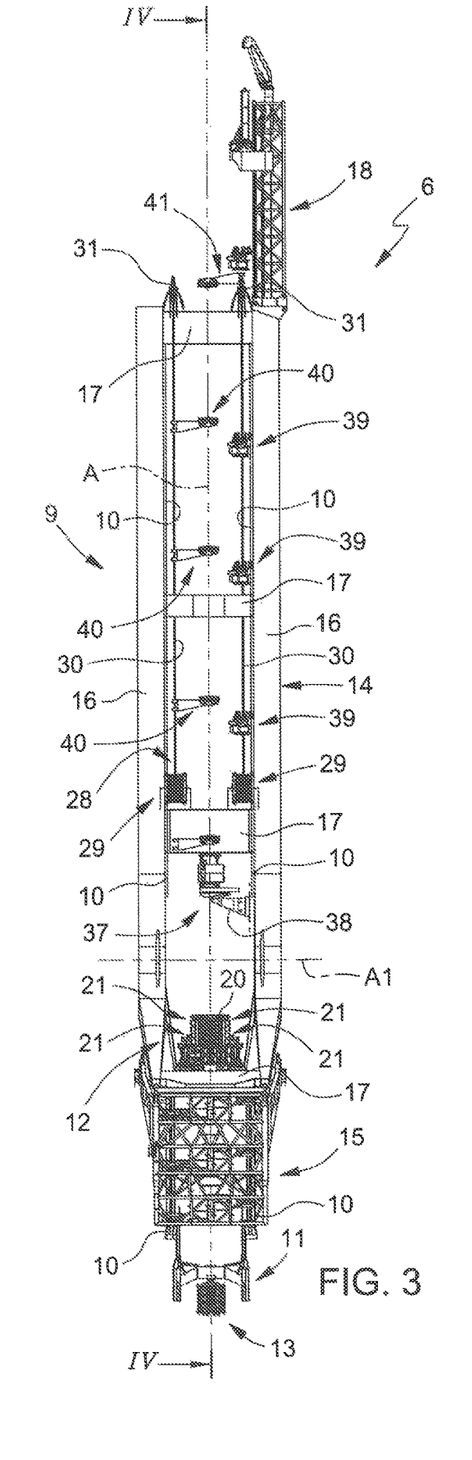
FIG. 3 is a front elevational view, on an enlarged scale and with parts removed for clarity, of a laying tower of the laying vessel in FIG. 1 made according to the present disclosure.
Figure 4:
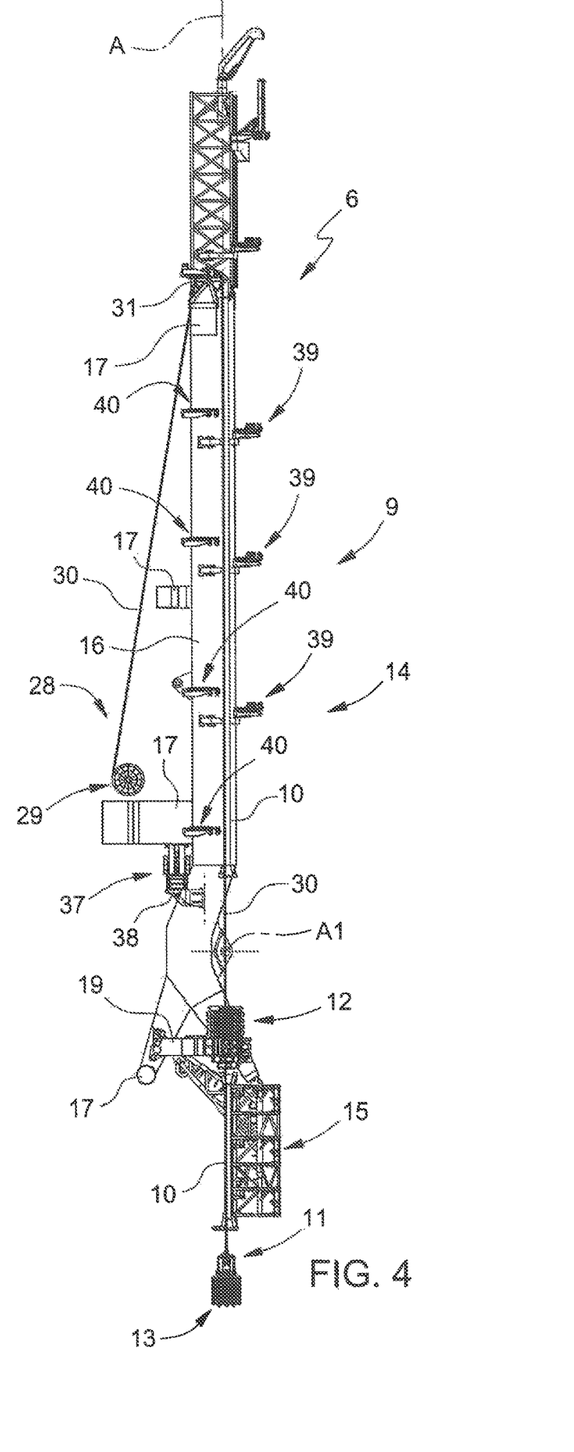
FIG. 4 is a sectional view, with parts removed for clarity, of the laying tower in FIG. 3 according to the section lines IV-IV.

With reference to FIGS. 3 and 4, the laying tower 6 comprises a supporting structure 9, which extends along the longitudinal axis A and comprises guides 10 parallel to the longitudinal axis A; a trolley 11 engageable in the guides 10 and selectively movable along a path P; a clamp 12, which is mounted on the supporting structure 9 and configured for selectively clamping and releasing the pipeline 2 (FIG. 1) in a given point along the longitudinal axis A; and a clamp 13, which is mounted on the trolley 11 and configured for selectively clamping and releasing the pipeline 2 (FIG. 1), both along a section T1 (FIG. 12) of path P extending above the clamp 12, and along a section of path T2 (FIG. 12), which extends below the clamp 12 and, partly, below the supporting structure 9.

The supporting structure 9 comprises a main frame 14 hinged to the laying vessel 1 about the axis A1; and a lower frame 15. The main frame 14 comprises two longitudinal beams 16 substantially parallel to the longitudinal axis A; and transverse beams 17. The longitudinal beams 16 and the transverse beams 17 are made with box-like profiles, of a metal material. The lower frame 15 is mounted at the lower end of the main frame 14 and defined by a reticular structure, which is generally called a "stinger" in the sector of pipeline laying.

The laying tower 6 comprises an upper frame 18, which, in this case, is a reticular structure, hinged to the main frame 14 and selectively movable between an operative position, wherein it defines the prolongation of the main frame 14, and a rest position (not shown) wherein it is arranged side by side to the main frame 14.

Figure 5:
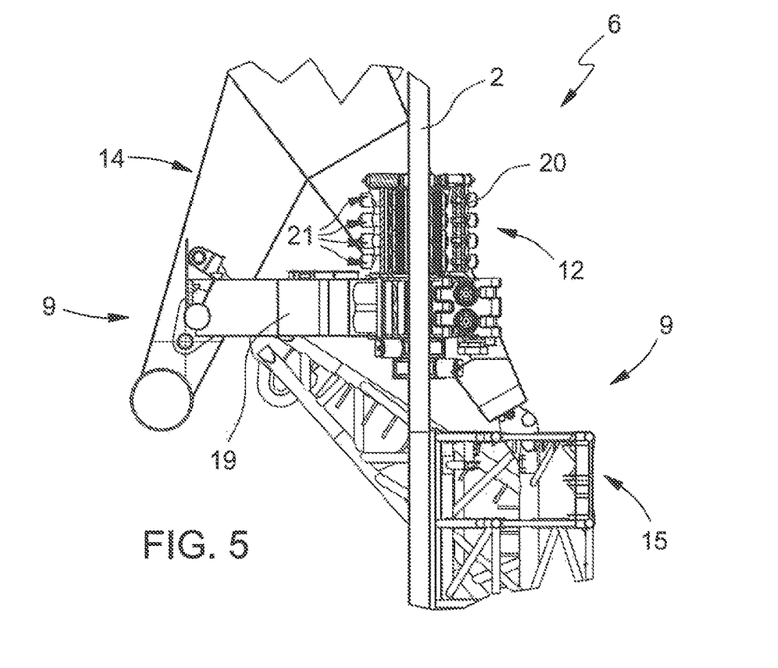
FIGS. 5 and 6 are side elevational views, with parts removed for clarity and on an enlarged scale, of a detail in FIG. 4 in two different configurations.
Figure 6:
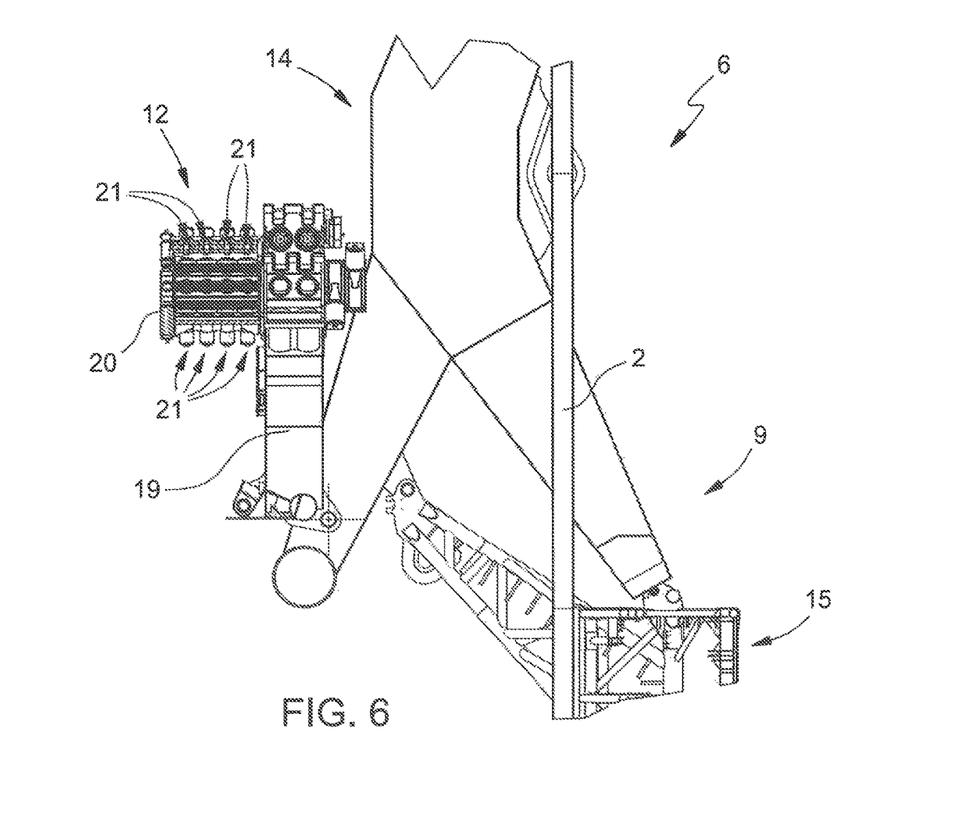

The clamp 12 is mounted to the supporting structure 9 so as to be selectively arranged in a first position along the longitudinal axis A (FIG. 5) and in a second position remote from the longitudinal axis A (FIG. 6).

With reference to FIGS. 5 and 6, the laying tower 6 comprises an arm 19, which is hinged to the supporting structure 9, configured for supporting the clamp 12 and tilting the clamp 12 between the first (FIG. 5) and the second position (FIG. 6) by an actuator (not shown).

The clamp 12 comprises a U-shaped plan structure 20; a plurality of jaws (not shown) and a plurality of actuators 21 supported by the U-shaped structure 20 and configured to actuate the jaws (not shown) between an open position and a closed position.

Figure 7:
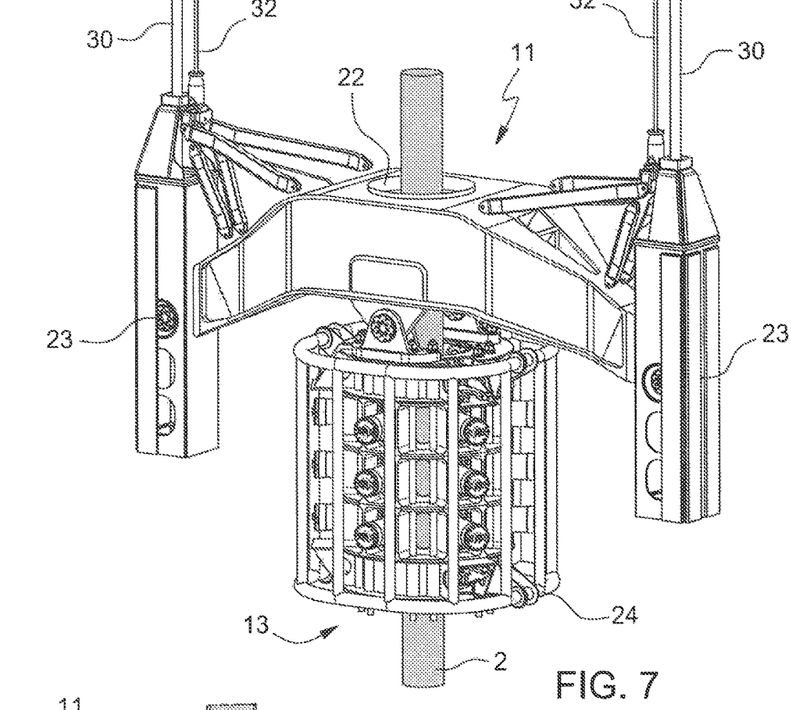
FIG. 7 is a perspective view, with parts removed for clarity, of a detail of the laying tower in FIG. 3.

With reference to FIG. 7, the trolley 11 comprises a frame 22; and two cursors 23 integral with the frame 22, which are arranged on opposite sides of the frame 22, configured to engage the guides 10 (FIGS. 3 and 4). The frame 22 further has a central opening for housing the pipeline 2 or a multiple joint with clearance.

Figure 8:
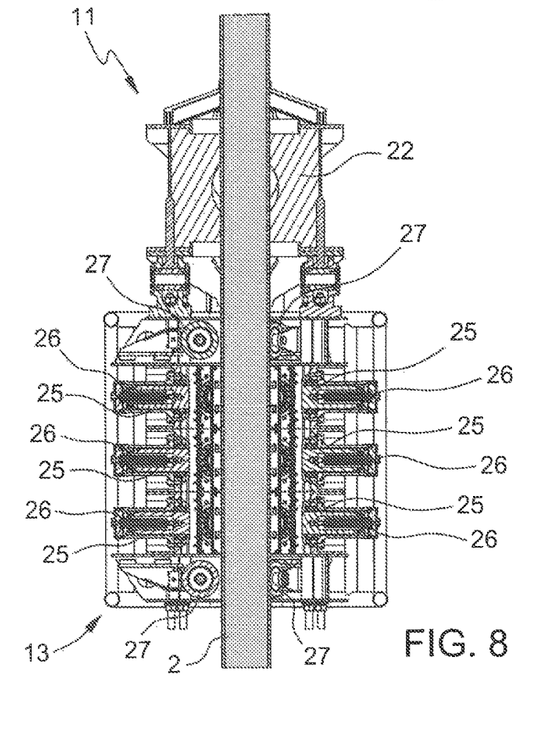
FIG. 8 is a sectional view, with parts removed for clarity, of the detail in FIG. 7.

With reference to FIGS. 7 and 8, the clamp 13 is hung to the trolley 11 and hinged to the trolley 11 so as to be able to oscillate freely with respect to the trolley 11 about an axis and comprises an annular structure 24; a plurality of jaws 25; and a plurality of actuators 26 supported by the annular structure 24 and configured to actuate the respective jaws 25 between a closed position and an open position. The clamp 13 further comprises rollers 27, configured for guiding the clamp 13 along the pipeline 2. The rollers 27 are mounted to the annular structure 24 and at the opposite ends of the clamp 13 with the function of favouring the sliding of the clamp 13 along the pipeline 2 or the multiple joint without damaging the pipeline 2 and the multiple joint.

With reference to FIGS. 3 and 4, the laying tower 6 comprises a cable actuating device 28 configured to control the position of the trolley 11 and the clamp 13 along the supporting structure 9 and along the pipeline 1 below the supporting structure 9. In other words, the trolley 1 is guided by the supporting structure 9 along the main frame 14 and along the lower frame 15 by the guides 10 and can come out of the guides 10 in the body of water 4. When the trolley 11 is not coupled to the guides 10 of the supporting structure 9, the trolley 11 and the clamp 13 are integrally coupled to the pipeline 2 or they are guided by the pipeline 2 inside the body of water 4.

To enable the trolley 11 to temporarily abandon the supporting structure 9 and be coupled again to the supporting structure 9, each guide 10 substantially has a recess, the lower ends of which are open and, in particular, flared. In this case, the cable actuating device 28 comprises two winches 29 mounted to the supporting structure 9; two cables 30 connected to the trolley 11 and two return pulleys 31 mounted to the supporting structure 9 above the respective winches 29.

With reference to FIG. 5, the laying tower 6 comprises a supply and control system, which comprises two umbilical cables 32 parallel to the cables 30 (as seen in FIG. 7) and connected to the trolley 11 and to the clamp 13. The umbilical cables 32 contain hydraulic pipes, electric cables and signal cables (not shown), configured to actuate and respectively control the clamp 13.

Figure 9:
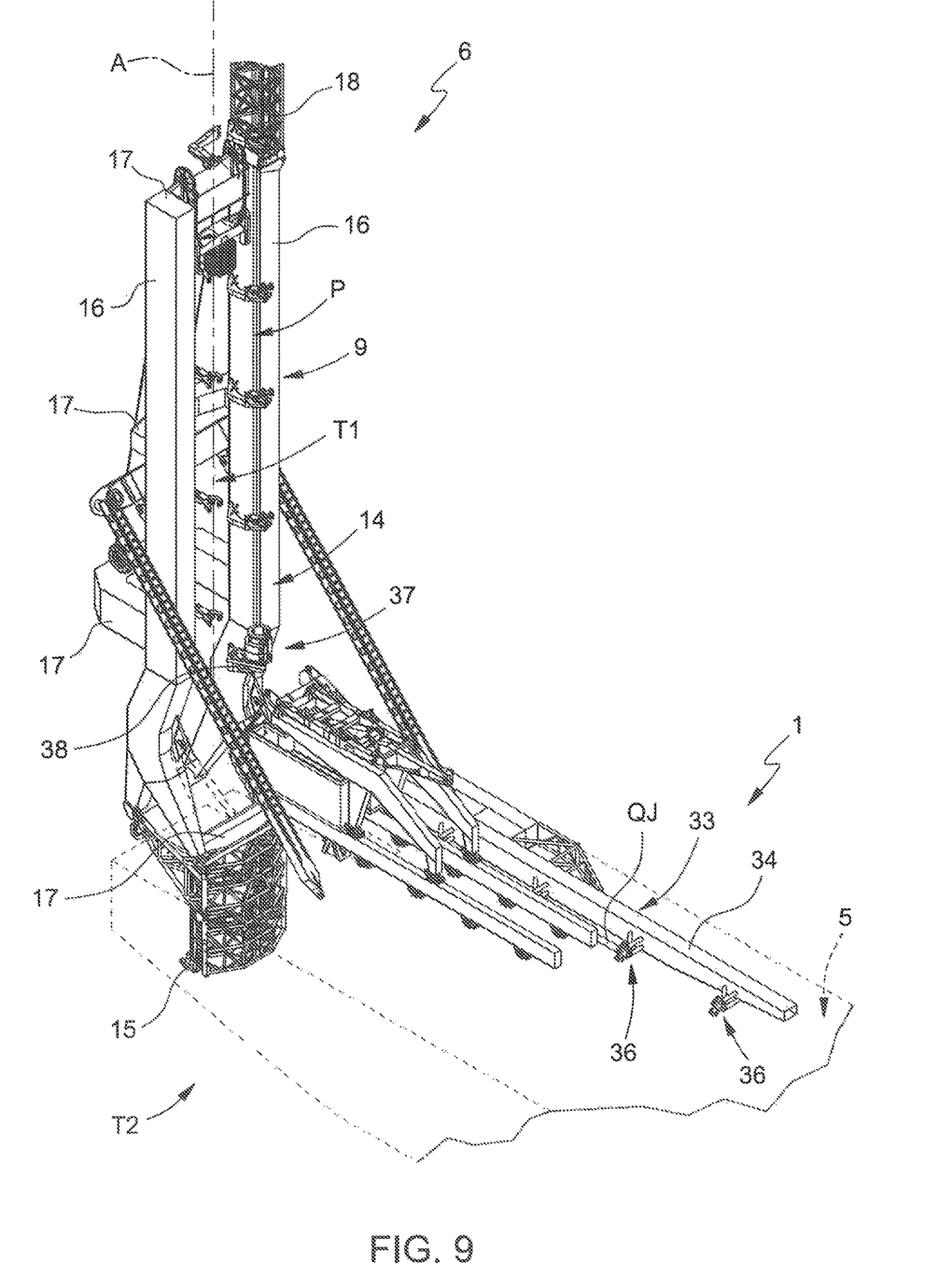
FIGS. 9 and 10 are perspective views, on an enlarged scale and with parts removed for clarity, of the laying vessel in FIG. 1.
Figure 10:
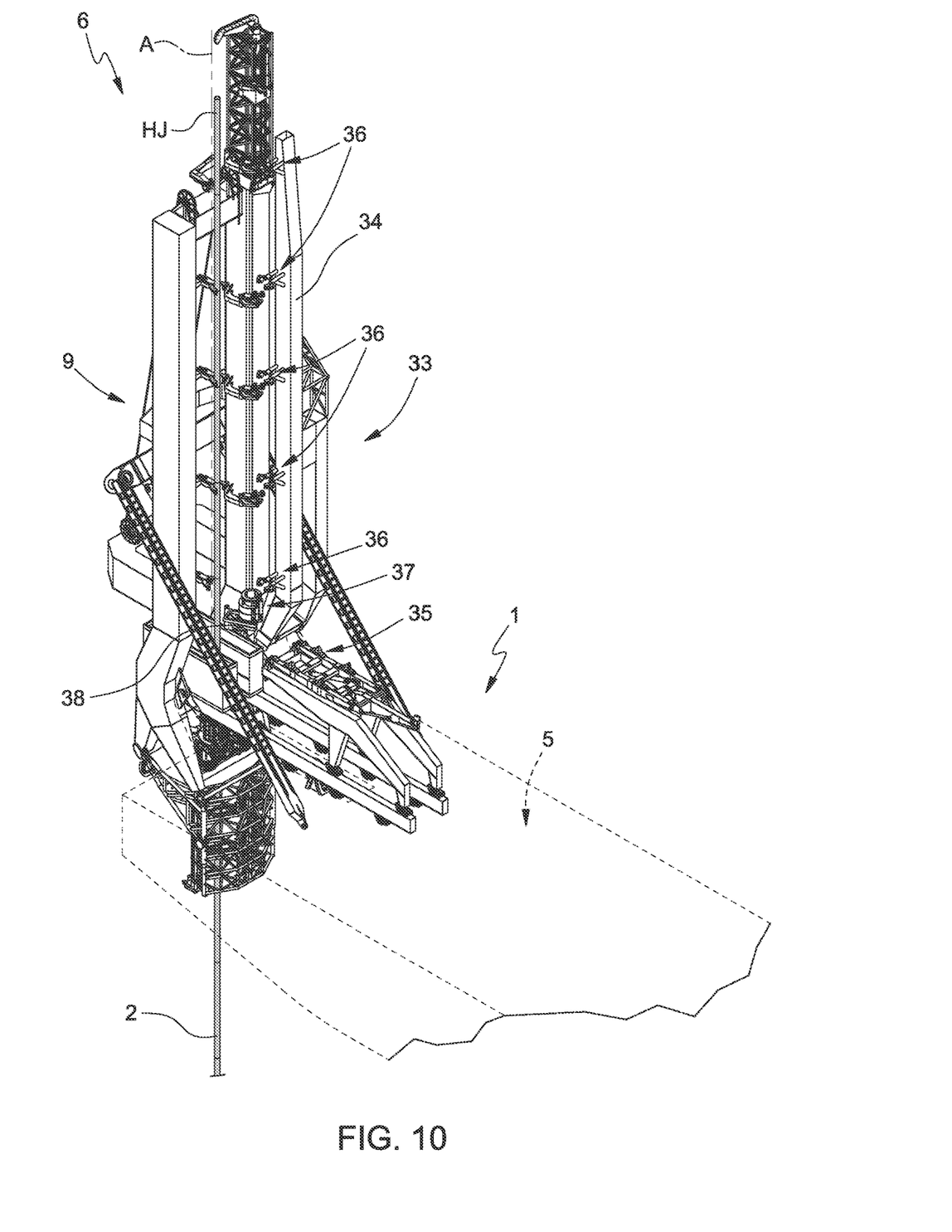

With reference to FIGS. 9 and 10, the laying tower 6 comprises a supply and guiding system configured to supply and guide the multiple joints in a given position in the laying tower 6. A joint QJ is illustrated in FIG. 9, while a joint HJ is illustrated in FIG. 10. In these embodiments, the multiple joints from the deck 5 of the laying vessel 1 must be arranged between the two longitudinal beams 17 in alignment and in contact with the pipeline 2 in order to be able to join the multiple joint to the pipeline 2 held by the clamp 12 (not visible in FIG. 9). The supply and guiding system comprises a load device 33, which comprises an arm 34 hinged about the axis A1; an actuating mechanism 35 configured to selectively arrange the arm 34 between a lowered position substantially parallel and close to the deck 5 of the laying vessel 1 (FIG. 9) and a raised position substantially parallel to the longitudinal axis A of the laying tower 6 (FIG. 6); and a plurality of gripping devices 36 distributed along the arm 34 configured to selectively grip a multiple joint in a plurality of points and releasing the multiple joint. The arm 34 extends for almost the entire length of the laying tower 6 and has the function of arranging a multiple joint relatively close to the longitudinal axis A. The supply and guiding system comprises devices associated with the laying tower 6 for transferring the multiple joint from the arm 34 to the laying tower 6 in alignment with the pipeline 2 and the longitudinal axis A.

In this particular case and with reference to FIGS. 3 and 4, the laying tower 6 comprises a transfer clamp 37, which is arranged above the clamp 12, it is configured for selectively clamping, releasing and supporting a multiple joint in proximity of the lower end of the same, and it is mounted to the supporting structure 9 by a movable arm 38 configured for arranging the transfer clamp 37 between a rest position remote from the longitudinal axis A; an operative position along the longitudinal axis A; and a second operative position offset with respect to said longitudinal axis A.

Figure 11:
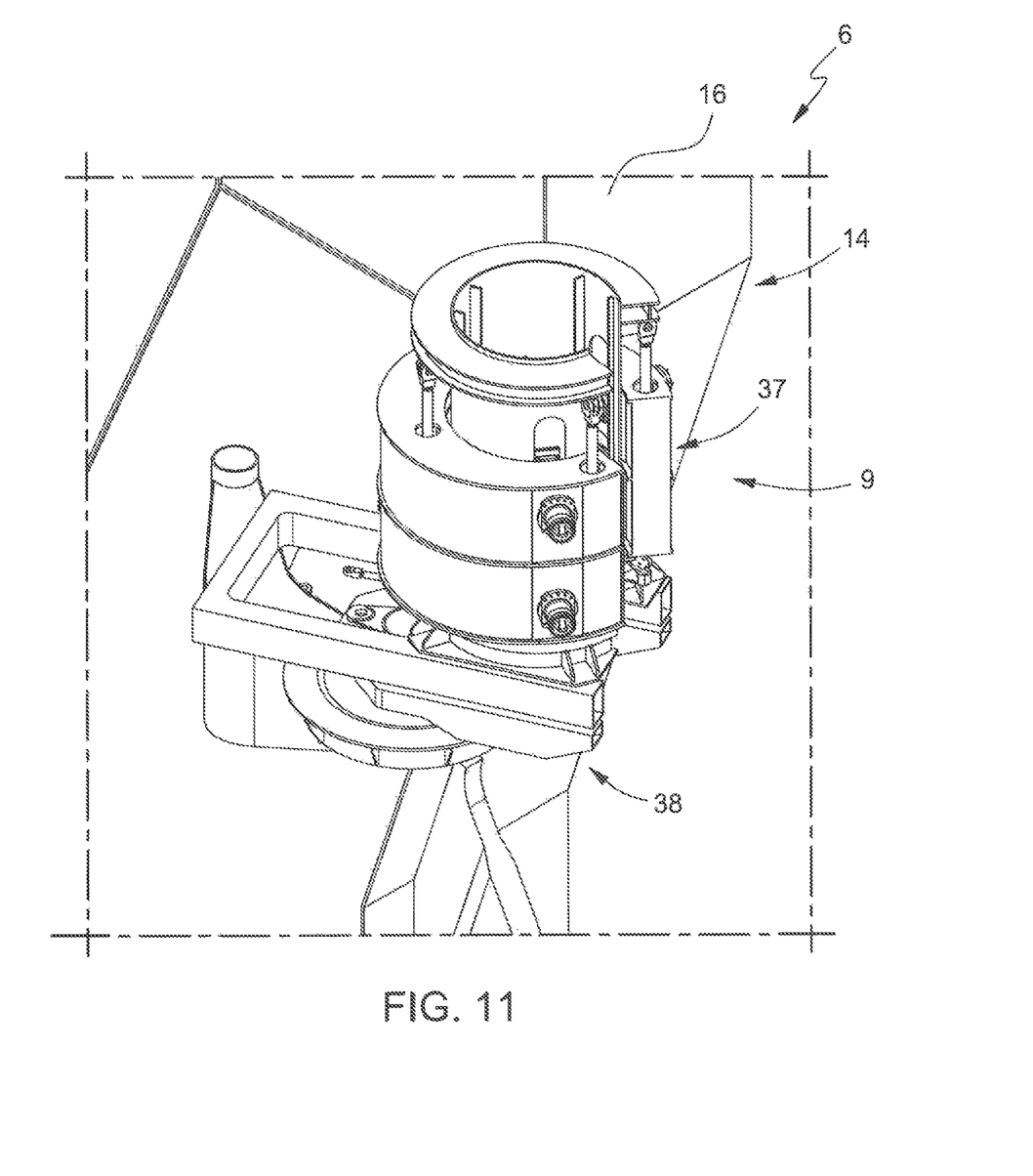
FIG. 11 is a perspective view, with parts removed for clarity, of a detail of the laying tower in FIG. 3.

With reference to FIG. 11, the movable arm 38 is hinged to the supporting structure 9 and it is telescopic. The transfer clamp 37 is configured to support the weight of the entire multiple joint.

With reference to FIGS. 3 and 4, the supply and guiding system comprises a plurality of manipulator arms 39, which are mounted to the supporting structure 9 above the transfer clamp 37, they can be selectively coupled to a multiple joint for transferring the multiple joint from a position offset with respect to the longitudinal axis A and a position coincident with the longitudinal axis A. In these embodiments, between a multiple joint held by the load device 33 (FIG. 7), when the arm 34 is parallel to the longitudinal axis A.

The supply and guiding system comprises a plurality of guiding elements 40, which are mounted in a retractable manner on the supporting structure 9 and configured for axially coupling in a sliding manner to a multiple joint.

The supply and guiding system comprises an aligning device 41 movable along the longitudinal axis A, and configured for housing the upper free end of a multiple joint. The aligning device 41 is mounted in a sliding manner parallel to the longitudinal axis A on the upper frame 18 to support the upper end of the multiple joint having a length equal to six times the length of the unitary joint. The aligning device 41 is designed or configured to operate only with the hexajoints HJ since the alignment of the quadruple joints QJ can be carried out by the clamp 13.

In use, a sequence of laying steps is described, wherein the laying tower 6 passes from a configuration for laying a pipeline 2 to which quadruple joints QJ are progressively joined (FIG. 2), to a configuration, wherein the pipeline 2 is joined, in successive steps, to hexajoints HJ (FIG. 2). For the laying of quadruple joints QJ, the clamp 13 performs travels along the section T1 of the path P above the clamp 12 where such travels are substantially equal to the length of a quadruple joint QJ.

Figure 12:
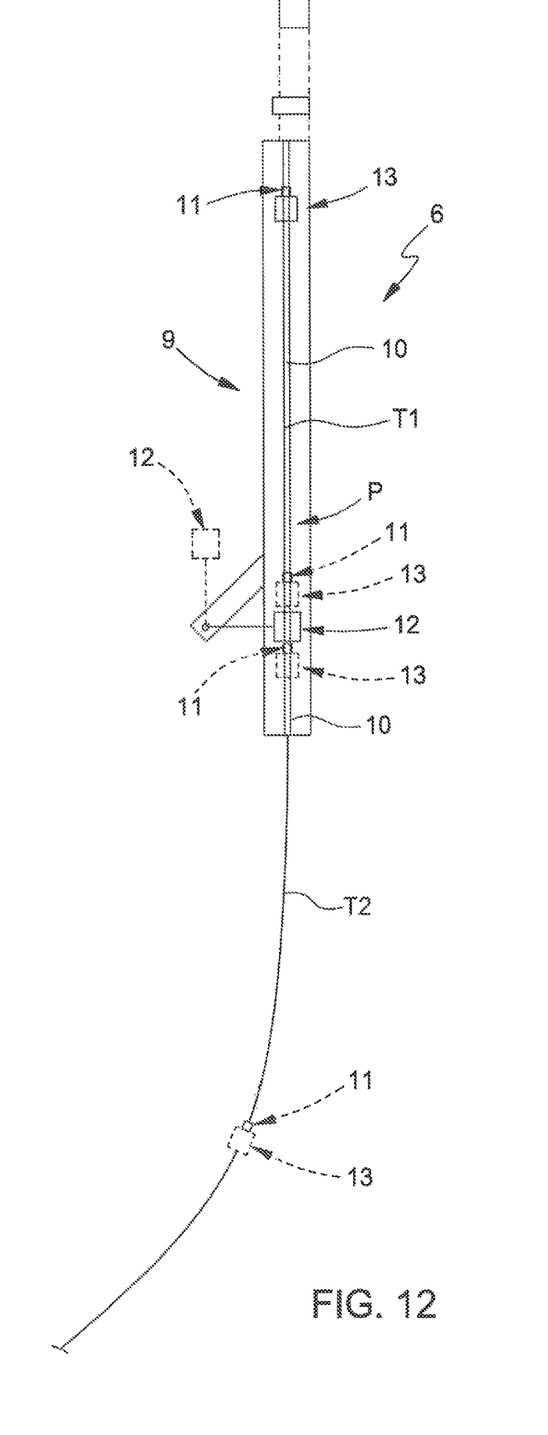
FIG. 12 is a schematic view, with parts removed for clarity, of the laying tower that is the subject of the present disclosure.

With reference to FIG. 12, the clamp 13 is shown with a continuous line at the upper end of the section T1 of the path P and sketched at the lower end of the section T1 of the path P, directly above the clamp 12. When a quadruple joint QJ is supplied to the supporting structure and aligned with the pipeline 2, the clamp 13 is lowered and inserted about the quadruple joint QJ at the upper end of the quadruple joint QJ. The clamp 13 grips the quadruple joint QJ in a given or designated position depending on the laying travel it has to complete and on the position the clamp 13 must be in after completing the laying travel. The assembling station (not shown in FIG. 8) joins the quadruple joint QJ to the free end of the pipeline 2 held in position by the clamp 12.

After completing the joining of the quadruple joint QJ to the pipeline 2. the clamp 12 is released and tilted in the configuration shown with sketched lines so as to enable the passage of the clamp 13. at the clamp 12. The travel downwards or laying travel of the clamp 13 is equal to the length of the quadruple joint QJ and the clamp 13 is stopped below the clamp 12, which is arranged in position again (with a complete line) ready to grip the pipeline 2.

The new position of the clamp 13 along the section T2 of the path P was determined by the choice of the point in which the clamp 13 gripped the quadruple joint QJ in the section T1 of the path P.

When the clamp 13 is arranged along the section T2 of path P, the laying tower 9 is ready to receive the hexajoints HJ. A hexajoint HJ is loaded into the supporting structure 9 in the same way as the quadruple joints QJ are loaded. The only difference lies in that the hexajoint HJ is aligned by the aligning device 41 instead of with the clamp 13.

Once the hexajoint HJ has been joined to the pipeline 2, the clamp 12 releases the pipeline 2, and the clamp 13 performs a laying travel equal to the length of the hexajoint HJ along the section T2. The laying travel of the clamp 13 along the section T2 is completed, partly, along the supporting structure 9 and, partly, freely in the body of water below the supporting structure 9. When the clamp 13 is not guided by the supporting structure 9, the clamp 13 is guided by the pipeline 2, which starts to bend slightly (the extent of the curvature depends on the depth of the sea-bed). Then, the clamp 13 is brought back by the cable actuating device 28 into the position directly below the clamp 12.

As in the previous description, the clamp 13 can be brought back to the section T1 of the path P. In particular, on completion of the laying travel, the clamp 13 grips the pipeline 2 in proximity of the clamp 12 and below the clamp 12, which is tilted to enable the passage of the clamp 13. When the clamp 13 is arranged along the section T1, the clamp 12 is positioned in the operative position and grips the pipeline 2 so that the pipeline 2 has the free end thereof at the assembling station 7. The clamp 13 releases the pipeline 2 and is then taken to the upper end of the section T1 of the path P, to enable the loading of a quadruple joint QJ or a quadruple joint comprising a special piece.

The present disclosure extends to further variants which are not explicitly described and which fall within the scope of protection of the claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A laying tower configured to lay a pipeline on a bed of a body of water, the laying tower comprising:
    a supporting structure extending along a longitudinal axis and comprising a plurality of guides parallel to the longitudinal axis, each guide defining a recess with a flared lower end;
    a first U-shaped clamp mounted on the supporting structure and selectively arrangeable in a first position along the longitudinal axis and in a second position remote from the longitudinal axis, the first U-shaped clamp configured to selectively clamp and release the pipeline at a designated point along the longitudinal axis, the first U-shaped clamp comprising a U-shaped structure, a first jaw, and a first actuator supported by the U-shaped structure and configured to actuate the first jaw from a closed position to an open position;
    a second clamp movable along a path that extends along a first section extending above the first U-shaped clamp and a second section below the first U-shaped clamp and partly below the supporting structure, the second clamp configured to selectively clamp and release the pipeline along the path; and
    a trolley comprising a frame and two cursors arranged on opposite sides of the frame and configured to engage the guides.

2. The laying tower of claim 1, further comprising a cable actuating device configured to control a position of the second clamp along at least one of the supporting structure and the pipeline.

3. The laying tower of claim 2, wherein the cable actuating device comprises two winches mounted to the supporting structure and two cables connected to the second clamp.

4. The laying tower of claim 1, further comprising a first arm hingedly connected to the supporting structure and configured to support the first U-shaped clamp and tilt the first U-shaped clamp from the first position to the second position.

5. The laying tower of claim 1, wherein the second clamp is configured to be hung on the trolley and hingedly connectable to the trolley.

6. The laying tower of claim 1, wherein the second clamp comprises an annular structure, a second jaw and a second actuator supported by the annular structure and configured to actuate the second jaw from an open position to a closed position.

7. The laying tower of claim 1, wherein the second clamp comprises a plurality of rollers configured to guide the second clamp along the pipeline.

8. The laying tower of claim 1, further comprising a supply and control system comprising a supply cable connectable to the second clamp.

9. The laying tower of claim 1, further comprising a transfer clamp arranged above the first clamp and mounted to the supporting structure by a movable arm configured to arrange the transfer clamp in a rest position remote from the longitudinal axis, an operative position along the longitudinal axis and an operative position offset from the longitudinal axis, the transfer clamp configured to selectively clamp, release and support a multiple joint.

10. The laying tower of claim 9, wherein the movable arm is hingedly connected to the supporting structure and comprises a telescopic arm.

11. The laying tower of claim 1, further comprising a plurality of manipulator arms mounted to the supporting structure above the first U-shaped clamp and selectively clamped to a multiple joint to transfer the multiple joint from an offset position with respect to the longitudinal axis to a position coincident with the longitudinal axis.

12. The laying tower of claim 1, further comprising a plurality of guiding devices configured to slidably axially couple to a multiple joint.

13. The laying tower of claim 1, further comprising an aligning device movable along the longitudinal axis and configured to house an upper free end of a multiple joint, wherein the aligning device is moveably mountable on the supporting structure to keep the multiple joint aligned with the longitudinal axis.

14. The laying tower of claim 1, further comprising a load device comprising an arm, an actuator to arrange the arm from a lowered position to a raised position substantially parallel to the longitudinal axis, and a plurality of gripping devices distributed along the arm and configured to selectively grip a multiple joint at a plurality of points.

15. The laying tower of claim 1, wherein the supporting structure comprises a main frame hingedly connectable to a laying vessel about an axis, and a lower frame, the guides extending along the main frame and the lower frame.

16. The laying tower of claim 1, wherein the supporting structure comprises a main frame hingedly connectable to a laying vessel about an axis, and an upper frame hingedly connected to the main frame and movable from an operative position that defines a prolongation of the main frame to a rest position wherein the upper frame is arranged side by side to the main frame.

17. A laying vessel for laying a pipeline on a bed of a body of water, the laying vessel comprising:
    a deck; and a laying tower moveably hinged about an axis, the laying tower extending above and below the axis and comprising:
- a supporting structure extending along a longitudinal axis and comprising a plurality of guides parallel to the longitudinal axis,
- a first U-shaped clamp mounted on the supporting structure and selectively arrangeable in a first position along the longitudinal axis and in a second position remote from the longitudinal axis, the first U-shaped clamp configured to selectively clamp and release the pipeline at a designated point along the longitudinal axis, the first U-shaped clamp comprising a U-shaped structure, a first jaw, and a first actuator supported by the U-shaped structure and configured to actuate the first jaw from an open position to a closed position, and
- a second clamp movable along a path that extends along a first section extending above the first U-shaped clamp and a second section below the first U-shaped clamp and partly below the supporting structure, the second clamp configured to selectively clamp and release the pipeline along the path.

18. The laying vessel of claim 17, further comprising an assembling station moveably mounted along the deck and selectively arranged in an operative position about the longitudinal axis and above the first clamp to join a multiple joint to the pipeline and in a remote position with respect to the operative position.

19. The laying vessel of claim 17, further comprising a platform movable from a rest position to an operative position parallel to the longitudinal axis and configured to arrange a multiple joint coupleable to a part of the pipeline a designated distance from the supporting structure.

20. A laying method for laying a pipeline on a bed of a body of water, the method comprising:
- keeping a free end of the pipeline in a designated position with a first U-shaped clamp arranged in a supporting structure of a laying tower;
- joining a multiple joint to the free end of the pipeline in the laying tower above the first U-shaped clamp;
- clamping the pipeline with a second clamp, wherein the second clamp is movable along a designated path which extends along a first section above the first U-shaped clamp and along a second section below the first U-shaped clamp and partly below the supporting structure, wherein when the multiple joint has a length corresponding to a length of the first section, the second clamp is above the first U-shaped clamp and when the multiple joint has a length corresponding to a length of the second section, the second clamp is below the first U-shaped clamp;
- releasing the first U-shaped clamp from the pipeline;
- arranging the first U-shaped clamp from a first position along the path to a second position remote from the path; and
- laying the pipeline by a stroke of the second clamp along a portion of the path.

21. The laying method of claim 20, wherein the first section is shorter than the second section.

22. The laying method of claim 20, further comprising guiding the second clamp along the supporting structure and along the pipeline.

23. The laying method of claim 20, further comprising releasing the second clamp from the supporting structure, and guiding the second clamp by the pipeline in the body of water along at least a part of the second section.

24. The laying method of claim 20, further comprising moving the second clamp along the path by a cable actuating device.

25. The laying method of claim 24, wherein the cable actuating device comprises two winches and two cables connected to the second clamp.

26. The laying method of claim 20, further comprising guiding the second clamp along the pipeline by a plurality of rollers rotatably mounted on the second clamp.

27. The laying method of claim 20, further comprising supplying the second clamp by a supply cable.

28. The laying method of claim 20, further comprising supporting a multiple joint transfer clamp arranged above the first U-shaped clamp and mounted to the supporting structure by a movable arm configured to arrange the multiple joint transfer clamp in a rest position remote from the longitudinal axis, an operative position along the longitudinal axis, and an operative position offset from the longitudinal axis, wherein the multiple joint transfer clamp is configured to selectively clamp, release and support the multiple joint.

29. The laying method of claim 20, further comprising transferring the multiple joint from a position offset from the longitudinal axis to a position coincident with the longitudinal axis by a plurality of manipulator arms mounted to the supporting structure above the first U-shaped clamp, wherein the manipulator arms are selectively coupleable to the multiple joint.

30. The laying method of claim 20, further comprising guiding the multiple joint along the first section of the path by a plurality of guiding devices supported by the supporting structure and configured to axially slidably couple to the multiple joint.

31. The laying method of claim 20, further comprising housing an upper end of the multiple joint by an aligning device, and aligning the multiple joint with the longitudinal axis by the aligning device.

32. The laying method of claim 31, further comprising varying a position of the aligning device along the longitudinal axis to adjust the position of the aligning device to the length of the multiple joint.

33. The laying method of claim 20, further comprising supplying the multiple joint to the supporting structure by a load device comprising an arm, an actuator configured to arrange the arm from a lowered position to a raised position substantially parallel to the longitudinal axis, and a plurality of gripping devices distributed along the arm and configured to selectively grip the multiple joint at a plurality of points.

\* \* \* \* \*